Oct. 3, 1967  T. H. LAVENGOOD  3,344,887
MACHINE TOOL LUBRICATOR
Filed Aug. 3, 1964  3 Sheets-Sheet 1
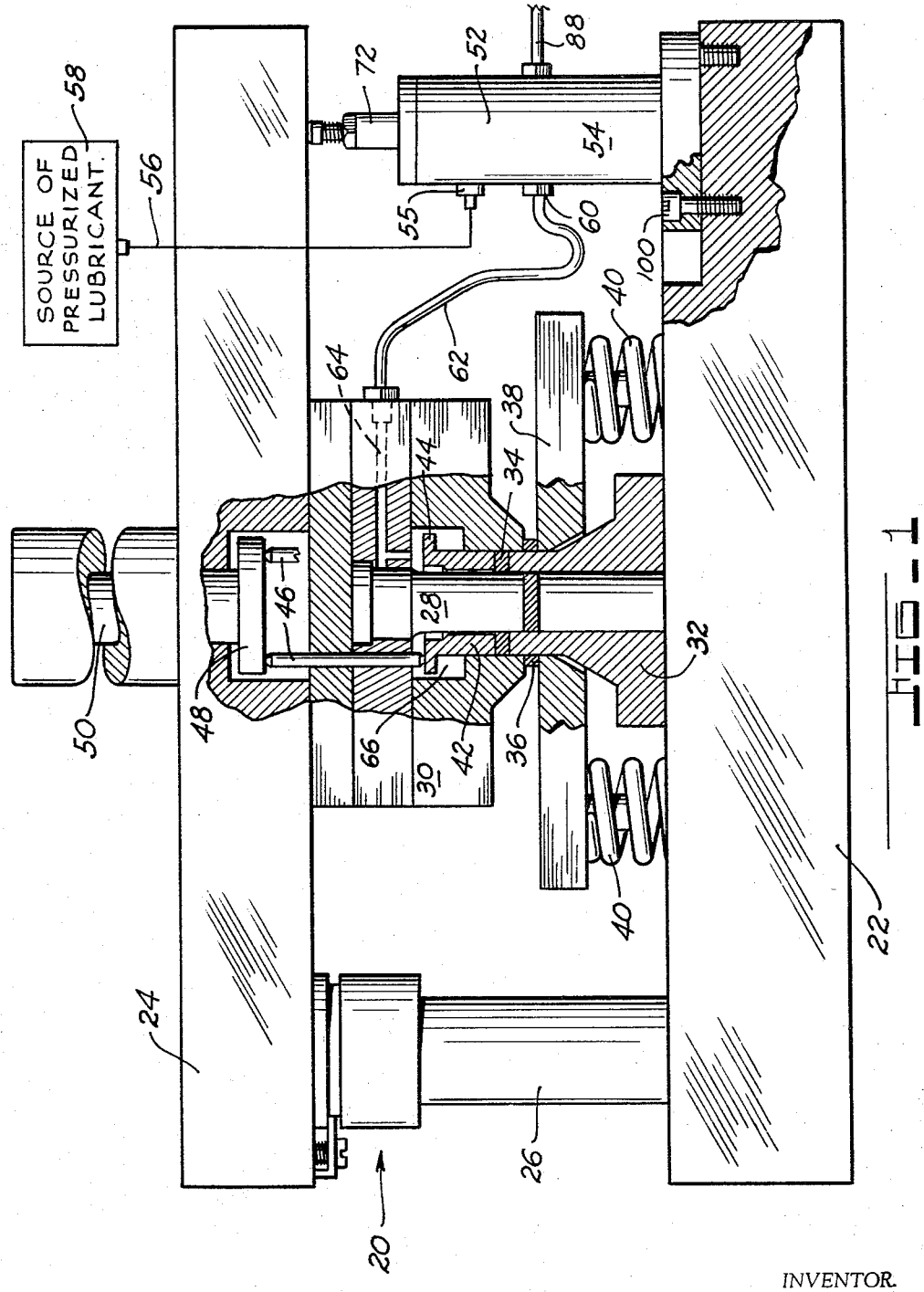
INVENTOR.
THOMAS H. LAVENGOOD.
BY
*Gordon H. Chavez*
AGENT.

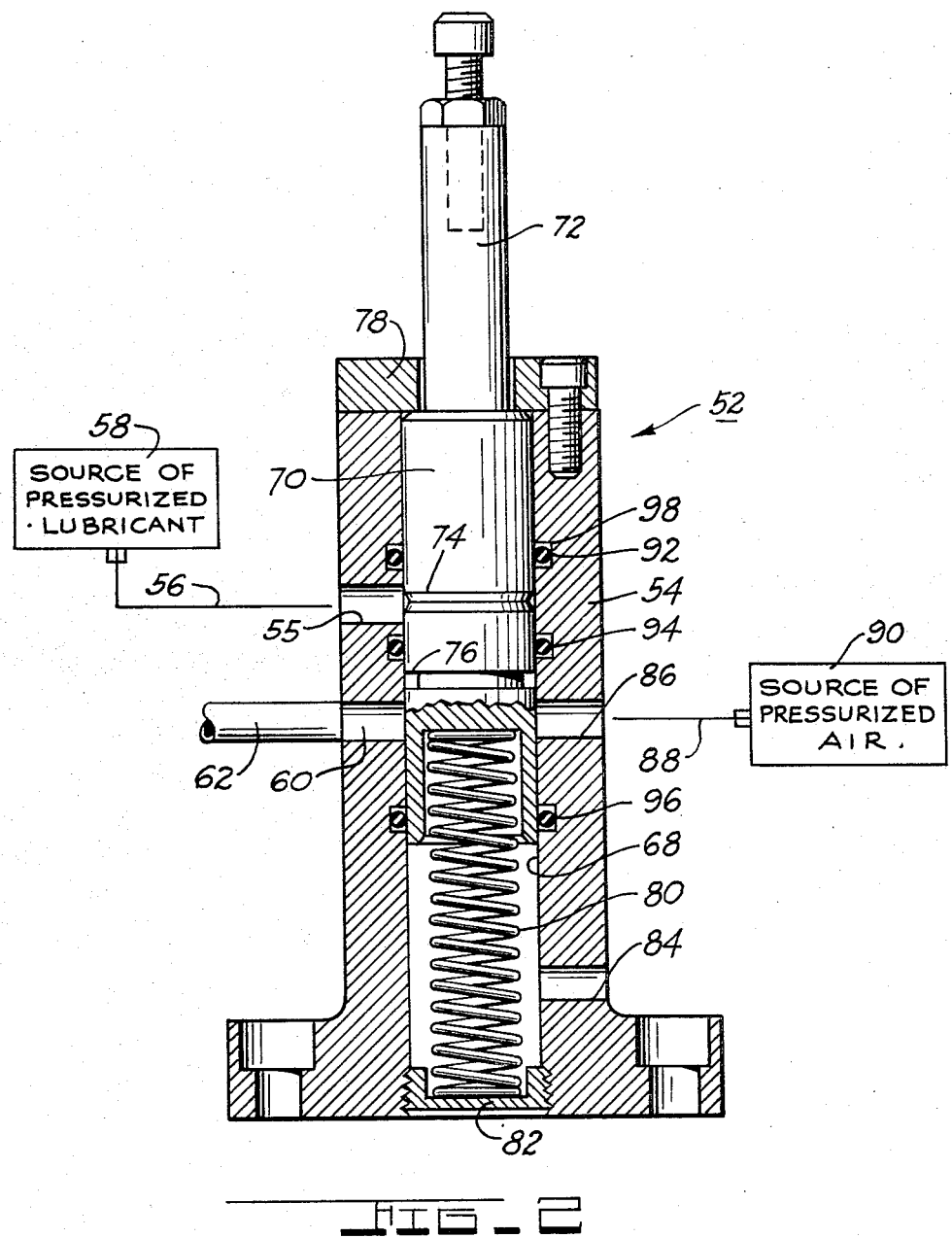

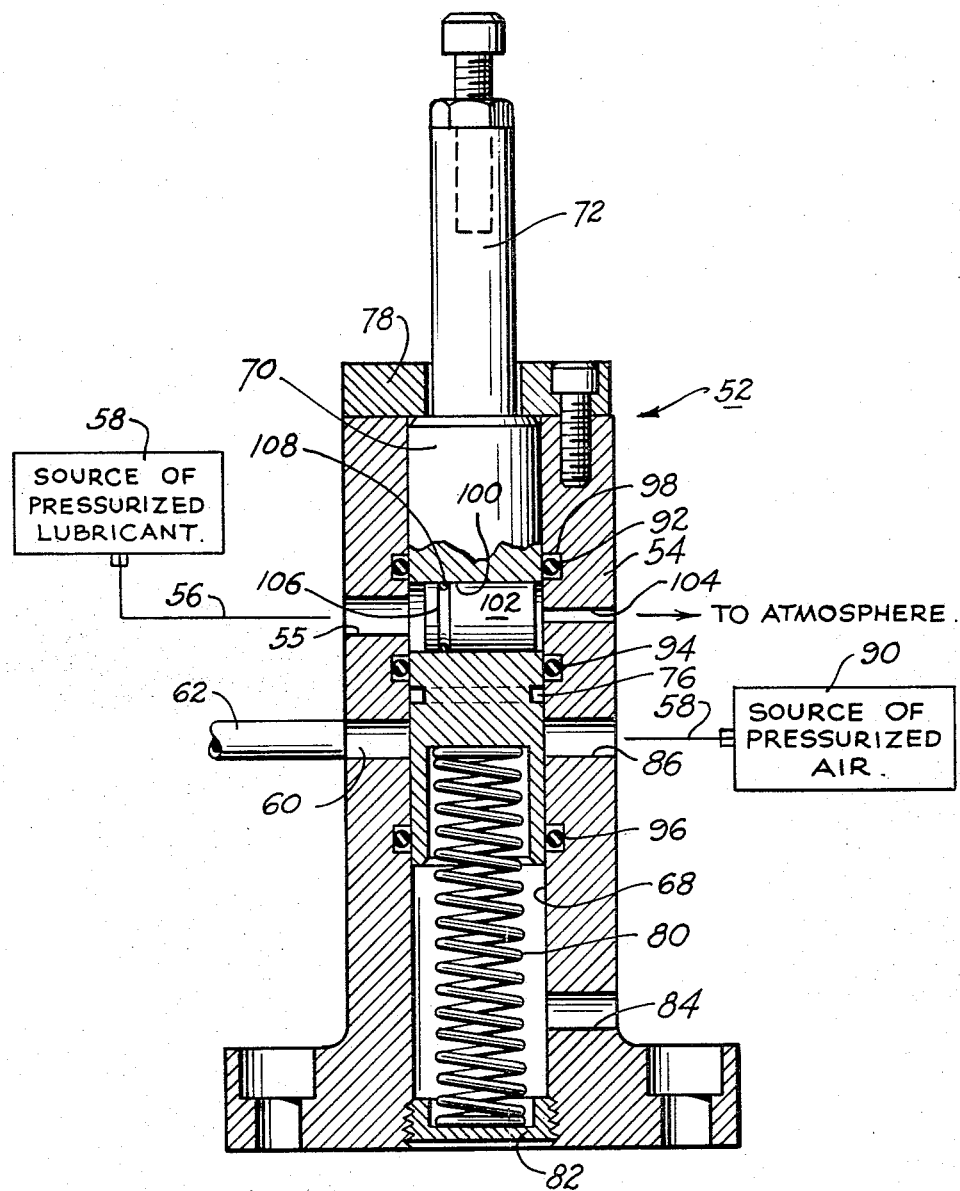

United States Patent Office 3,344,887
Patented Oct. 3, 1967

3,344,887
MACHINE TOOL LUBRICATOR
Thomas H. Lavengood, South Bend, Ind., assignor to The Bendix Corporation, South Bend, Ind., a corporation of Delaware
Filed Aug. 3, 1964, Ser. No. 386,891
4 Claims. (Cl. 184—7)

This invention relates, in general, to automatic lubricating mechanism and, in particular, to an automatically operated lubricating device for a die machine tool or the like.

Various conventional automatic lubricating devices have been proposed to provide a periodic flow of lubricant to selected portions of a machine tool such as a die press or the like. A common disadvantage of such existing devices as, for example, that shown in Patent No. 2,521,177 issued Sept. 5, 1950, to C. C. S. Le Clair is the requirement for a relatively complicated array of valves and control mechanisms for actuating the same. It is readily apparent that the reliability, original cost of installation, maintenance cost, etc. are directly related to the complexity of the device. Since it is desirable to have maximum reliability with minimum cost, such lubricating devices should be capable of performing the required lubricating function, with a minimum number of elements preferably controlled in a simple and positive manner. It is, therefore, an object of the present invention to provide a simple and reliable lubricating device which requires a single valve member positively actuated by a movable portion of a machine tool to be supplied a periodic metered flow of lubricant by the valve member under the influence of a readily available and reliable source of shop pressurized air.

It is an object of the present invention to provide a simply constructed, effective and compact lubricating device which is easily attached to a machine tool and which requires no external valves or the like.

It is another object of the present invention to provide a relatively inexpensive mechanically operated machine tool lubricating device which provides reliable lubrication without the need for extensive maintenance.

Other objects and advantages of the present invention will become apparent with reference to the accompanying drawings wherein:

FIGURE 1 is a schematic representation of a die machine tool embodying the die lubricator of the present invention;

FIGURE 2 is a sectional view of the die lubricator shown in FIGURE 1; and

FIGURE 3 is a sectional view of a second embodiment of the present invention.

Referring to the drawings and, in particular to FIGURE 1, numeral 20 identifies a conventional power press having a fixed bed 22 and a vertically movable ram portion 24, the latter being actuated by suitable motor means, not shown, and aligned with bed 22 via a shaft 26 fixedly secured to ram portion 24 and slidably carried in bed 22. An upper die including inner and outer die members 28 and 30, respectively, is fixedly secured to ram portion 24 and slidably carried in bed 22. An upper die including inner and outer die members 28 and 30, respectively, is fixedly secured to ram portion 24 and movable therewith. A lower die 32 fixedly secured to bed 22 cooperates with upper die members 28 and 30 to form a washer shaped member 34 from a metal blank 36 as shown in FIGURE 1 wherein the upper die is shown in a down position. The metal blank 36 is trapped between outer die member 30 and a vertically movable plate 38 which surrounds lower die 32 and which is loaded by springs 40.

An annular knock-out member 42 slidably carried between inner and outer die members 28 and 30 is provided with a flanged portion 44 which is engaged by one end of a plurality of rods 46 slidably carried in the upper die. The opposite ends of rods 46 are engaged by a flanged end 48 of a shaft 50 slidably carried in ram portion 24. Conventional stop means, not shown, engageable with shaft 50 when the ram portion 24 and attached die members 28 and 30 are raised from the position shown in FIGURE 1 serves to hold shaft 50 as well as knock-out member 42 operatively connected thereto stationary. Upward movement of the ram portion 24 and die members 28 and 30 from the position shown in FIGURE 1 results in die members 28 and 30 sliding along knock-out member 42 to a position relative thereto whereby the washer shaped member 34 is ejected from die members 28 and 30. On a subsequent down stroke of ram portion 24 and die members 28 and 30, the knock-out member 42 engages the metal blank 36 which limits downward movement of the knock-out member 42 whereupon the die members 28 and 30 move downward relative thereto to the bottom of the working stroke of the press.

It is desirable to eliminate the possibility of seizure the knock-out member 42 within the die members 28 and 30. To this end, an automatic lubricating device 52 which embodies the present invention is connected to supply a predetermined quantity of lubricating oil or other suitable lubricating medium to the sliding surfaces of the knock-out member 42 and/or die members 28 and 30. As shown in FIGURE 1, the device 52 is provided with a casing 54 having an inlet port 55 suitably connected via a conduit 56 to a source of pressurized lubricant 58 and an outlet port 60 suitably connected via a flexible conduit 62 to a passage 64 in die member 30. The passage 64 communicates with a recess 66 formed in die member 30 into which the upper portion of knock-out member 42 extends.

Referring to FIGURE 2, the casing 54 is provided with a bore 68 which slidably receives a plunger 70 having an adjustable extension 72 and spaced apart annular recesses 74 and 76 formed thereon. The adjustable extension 72 extends through a cap 78 suitably secured to casing 54 and adapted to retain plunger 70 in bore 68. A compression spring 80 interposed between one end of plunger 70 and a plug 82 threadedly engaged with casing 54 at one end of bore 68 serves to urge plunger 70 against cap 78. The annular recess 74 is made preferably with a V-shaped cross section whereas the annular recess 76 may be of any desired cross section.

The volume defined by bore 68 between plunger 70 and plug 82 is vented to ambient pressure via a port 84 in casing 54. A port 86 extends through the wall of casing 54 into communication with bore 68 and is adapted to communicate via passage 88 with a source of pressurized air 90. Leakage of lubricant and/or pressurized air between adjacent sliding surfaces of the plunger 70 and casing 54 is minimized by seals 92, 94 and 96 suitably spaced apart as shown and contained by an associated recess 98 formed in casing 54.

The casing 54 is apertured for attachment to bed 22 by means of suitable fastening members such as bolts 100 threadedly engaged with bed 22.

As indicated in FIGURE 1, the plunger 70 is adapted to reciprocate in bore 68 in response to up and down stroking of ram portion 24 which engages extension 72. Referring to FIGURE 2, it will be assumed that the ram portion 24 is in an up position in which case the plunger 70 is urged upward into engagement with cap 78 by spring 80. The source 58 forces pressurized lubricant through port 55 into annular recess 74 which fills to capacity, which capacity for a given width of the recess 74 depends upon the angle defined by the sides of the recess 74 and may be selected accordingly to suit requirements.

The extension 72 and plunger 70 attached thereto are actuated downward against the resistance of spring 80 by ram portion 24 during the downward stroke of the latter which results in annular recess 76 registering with port 60 and port 86 as well as annular recess 74 with lubricant trapped therein moving out of registry with port 55. Pressurized air transmitted through recess 76 from port 86 to port 60 passes through conduit 62 and passage 64 thereby clearing the same. Continued downward movement of ram portion 24 results in annular recess 76 moving out of registry with ports 60 and 86 and annular recess 74 moving into registry with ports 60 and 86 whereupon the pressurized air from port 86 forces the lubricant out of recess 74 through port 60, conduit 62, passage 64 and into recess 66 surrounding knock-out member 42. From recess 66 the pressurized lubricant passes to the adjacent sliding surfaces of knockout member 42 and inner and outer die members 28 and 30 thereby lubricating the same. If desired, the inner diameter of knock-out member 42 may be made slightly larger than the diameter of die member 28 to permit the lubricant to flow from recess 66 to the surface of metal blank 36 in sufficient quantity to provide lubrication for the die surfaces as well. As the ram portion 24 moves to the limit of its downward stroke as shown in FIGURE 1, the upper and lower dies 30 and 32 cooperate to cut washer shaped member 34 from the metal blank 36 as shown. The ram portion 24 subsequently begins its upward stroke permitting plunger 70 to move upward in response to spring 80 whereupon annular recess 76 moves out of registry with ports 60 and 86. The annular recess 76 briefly registers with ports 60 and 86 permitting pressurized air to pass into passage 62 thereby repeating the aforementioned clearing action. The upward movement of plunger 70 continues until the ram portion 24 approaches the limit of its upward stroke at which time the plunger 70 engages cap 78. The annular recess 74 is again charged with lubricant from port 55 and the aforementioned cycle is repeated as the ram portion begins another downward stroke.

Referring to FIGURE 3 which illustrates a modified form of the automatic lubricating device 52, structure similar to that of FIGURE 2 is identified by like numerals. The plunger 70 is provided, in place of annular recess 74, with a transverse bore 100 which slidably contains a double ended piston 102 exposed at one end to port 55 and at the opposite end to a port 104 which extends through casing 54 thereby venting bore 100 to the atmosphere. An annular recess 106 in piston 102 contains a seal 108 which serves to minimize leakage between adjacent sliding surfaces of piston 102 and casing 54.

In FIGURE 3, the plunger 70 is shown abutting end cap 78 with the bore 100 in open communication with port 55. The pressurized lubricant entering port 55 passes into bore 100 filling bore 100 to the extent permitted by the piston 102 which is displaced toward port 104. As in the case of FIGURE 2, the quantity of lubricant carried by plunger 70 may be varied depending upon requirements. To that end, the length of piston 102 may be increased or decreased to provide a corresponding increase or decrease, respectively, in the volume of bore 100 exposed to port 55.

As in the case of FIGURE 1, the plunger 70 is actuated against spring 80 in response to movement of ram portion 24 during the down stroke thereof. The annular recess 76 communicates with ports 60 and 86 providing the clearing action heretofore mentioned following which the bore 100 moves into registry with ports 60 and 86. The pressurized air transmitted through port 86 to the adjacent end of bore 100 acts against the one end of piston 102 thereby urging the piston 102 toward port 60 which, in turn, results in lubricant being forced from bore 100 through port 55 into passage 62, passage 64 and recess 66 to the extent provided by the effective capacity of bore 100 heretofore mentioned. Upon return of the plunger 70 to the position shown in FIGURE 3 following the upstroke of ram portion 24, the bore 100 again communicates with the port 55 whereupon pressurized lubricant forced into bore 100 urges piston 102 toward port 104 to the limit of its stroke.

Various changes and modifications of the structure disclosed in the drawings and described heretofore may be made by those persons skilled in the art without departing from the scope of applicant's invention.

I claim:
1. Lubricating apparatus for a machine press or the like having a fixed portion and a movable portion the combination of:
   a casing having a bore formed therein;
   a source of pressurized lubricant;
   a source of pressurized air;
   a first inlet port communicating with said bore and connected to supply pressurized lubricant to said bore from said source;
   a second inlet port communicating with said bore and connected to supply pressurized air to said bore from said source;
   an outlet port communicating with said bore and connected to supply lubricant to a selected portion of the machine press;
   a member slidably disposed in said bore and operatively connected to and actuated by the movable portion of the press;
   a first cavity formed in said member and adapted to be charged with lubricant from said first inlet port with which said cavity registers at a first position of said slidable member;
   said cavity charged with lubricant registering with said second inlet port and said outlet port at a second position of said slidable member whereupon said lubricant is forced out of said cavity through said outlet port to said selected portion of the machine press in response to said pressurized air; and
   a second cavity formed in said member in spaced apart relationship with said first cavity and adapted to register with said second inlet port and said outlet port at a position of said member intermediate said first and second positions thereof whereby pressurized air is allowed to pass through said second cavity to clear said outlet port prior to the discharging of lubricant through said outlet port.

2. Lubricating apparatus for a machine press or the like as claimed in claim 1 wherein said casing is fixedly secured to the fixed portion of the press and said slidable member is movable relative thereto in response to movement of the movable portion of the press.

3. Lubricating apparatus for a machine press or the like as claimed in claim 1 wherein said slidable member is circular and said first and second cavities formed therein are defined by first and second annular recesses, respectively.

4. Lubricating apparatus for a machine press or the like as claimed in claim 1 wherein said first cavity is defined by a transverse bore formed in said slidable member and one end of a double ended piston slidably carried in said transverse bore, said piston being urged to the limit of its stroke in one direction by the pressurized lubricant charging said cavity and acting against said one end of said piston and to the limit of its stroke in the opposite direction by the pressurized air acting against the opposite end of said piston.

References Cited

UNITED STATES PATENTS

| 1,763,487 | 6/1920 | Taylor | 222—217 |
| 1,805,609 | 5/1931 | Wilson. | |
| 2,020,916 | 11/1935 | Still | 222—194 |
| 2,521,177 | 9/1950 | Le Clair | 184—7 |
| 2,649,289 | 8/1953 | Giberson | 222—194 X |
| 2,914,223 | 11/1959 | Richter | 222—194 |
| 3,244,328 | 4/1966 | Brown | 222—194 |

LAVERNE D. GEIGER, *Primary Examiner.*

E. J. EARLS, *Assistant Examiner.*